United States Patent
Wang

(10) Patent No.: US 10,721,249 B2
(45) Date of Patent: Jul. 21, 2020

(54) METHOD FOR WEB APPLICATION LAYER ATTACK DETECTION AND DEFENSE BASED ON BEHAVIOR CHARACTERISTIC MATCHING AND ANALYSIS

(71) Applicant: MOLBASE (Shanghai) Biotechnology Co., Ltd, Shanghai (CN)

(72) Inventor: Jian Guo Wang, Shanghai (CN)

(73) Assignee: MOLBASE (SHANGHAI) BIOTECHNOLOGY CO., LTD., Shanghai (CN)

( * ) Notice: Subject to any disclaimer, the term of this patent is extended or adjusted under 35 U.S.C. 154(b) by 298 days.

(21) Appl. No.: 15/896,419

(22) Filed: Feb. 14, 2018

(65) Prior Publication Data
US 2018/0262521 A1 Sep. 13, 2018

(30) Foreign Application Priority Data
Mar. 13, 2017 (CN) .......................... 2017 1 0145187

(51) Int. Cl.
*H04L 29/06* (2006.01)
*G06N 3/08* (2006.01)
*G06N 7/00* (2006.01)

(52) U.S. Cl.
CPC ........ *H04L 63/1416* (2013.01); *H04L 63/101* (2013.01); *H04L 63/1466* (2013.01); *G06N 3/08* (2013.01); *G06N 7/005* (2013.01); *H04L 63/168* (2013.01)

(58) Field of Classification Search
CPC ............. H04L 63/1416; H04L 63/1466; H04L 63/101; H04L 63/168; H04L 63/1441; G06N 7/005; G06N 3/08
See application file for complete search history.

(56) References Cited

U.S. PATENT DOCUMENTS

| 7,454,792 | B2 * | 11/2008 | Cantrell | ................. H04L 43/00 709/224 |
| 8,752,138 | B1 * | 6/2014 | Bennett | ................. H04L 65/403 348/211.12 |
| 9,424,612 | B1 * | 8/2016 | Bright | .................... G06Q 50/01 |
| 9,516,053 | B1 * | 12/2016 | Muddu | ............... H04L 63/1408 |
| 9,609,011 | B2 * | 3/2017 | Muddu | ................... H04L 41/22 |
| 10,009,358 | B1 * | 6/2018 | Xie | ....................... G06F 21/316 |

(Continued)

*Primary Examiner* — Michael R Vaughan
(74) *Attorney, Agent, or Firm* — Muncy, Geissler, Olds & Lowe, PC

(57) ABSTRACT

A method for web application layer attack detection and defense based on behavior characteristic matching and analysis includes presetting a defense rule base, the defense rule base including a plurality of defense rules; acquiring a record that access request data matches the defense rule base in a web application protection system and taking the record as sample data; learning the sample data to establish an analysis model; establishing a user reputation database and setting a blacklist module in the user reputation database; learning the user's access behavior through the analysis model and updating and correcting the defense rules in the defense rule base; establishing an exception defense rule base; and setting a defense method and intercepting the user's access behavior according to the defense method. By intelligently learning the user's behavior, threat behavior can be identified and intercepted quickly to ensure the security of the web server.

8 Claims, 1 Drawing Sheet

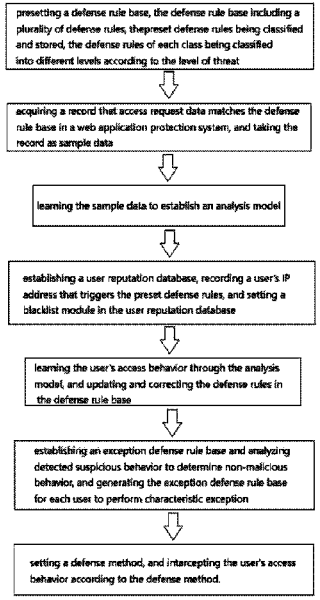

(56) References Cited

U.S. PATENT DOCUMENTS

| | | | | |
|---|---|---|---|---|
| 10,154,051 | B2* | 12/2018 | Sofka | H04L 63/1416 |
| 10,439,985 | B2* | 10/2019 | O'Neil | H04L 43/0817 |
| 2014/0358939 | A1* | 12/2014 | Simon | G06F 16/24578 |
| | | | | 707/748 |
| 2016/0149887 | A1* | 5/2016 | Katmor | H04L 69/161 |
| | | | | 726/1 |
| 2017/0279839 | A1* | 9/2017 | Vasseur | G06F 17/18 |
| 2017/0372071 | A1* | 12/2017 | Saxe | G06F 21/567 |
| 2019/0251260 | A1* | 8/2019 | Stockdale | H04L 63/1433 |
| 2019/0342319 | A1* | 11/2019 | Luo | G06F 21/55 |

* cited by examiner presetting a defense rule base, the defense rule base including a
plurality of defense rules, thepreset defense rules being classified
and stored, the defense rules of each class being classified
into different levels according to the level of threat

acquiring a record that access request data matches the defense
rule base in a web application protection system, and taking the
record as sample data

learning the sample data to establish an analysis model

establishing a user reputation database, recording a user's IP
address that triggers the preset defense rules, and setting a
blacklist module in the user reputation database

learning the user's access behavior through the analysis
model, and updating and correcting the defense rules in
the defense rule base

establishing an exception defense rule base and analyzing
detected suspicious behavior to determine non-malicious
behavior, and generating the exception defense rule base
for each user to perform characteristic exception

setting a defense method, and intercepting the user's access
behavior according to the defense method.

METHOD FOR WEB APPLICATION LAYER ATTACK DETECTION AND DEFENSE BASED ON BEHAVIOR CHARACTERISTIC MATCHING AND ANALYSIS

FIELD OF THE INVENTION

The present invention relates to web security defenses, and in particular, to a method for web application layer attack detection and defense based on behavior characteristic matching and intelligent behavior analysis.

BACKGROUND OF THE INVENTION

With the popularity of the web, the web is widely used to social applications, e-commerce, and online payment. Various zero-day vulnerabilities are disclosed, sql injection, xss cross-site, cookie tampering, malicious scan detection, session hijacking, denial of service attacks, man-in-the-middle attacks, remote command execution, webshell attacks and other attacks are becoming more and more normal. Various information disclosure incidents are constantly being exposed. Web security threat is extremely serious. New attacks emerge in an endless stream, bringing great challenges to web security. Web security threats seriously affect the security of political, economic and military information systems and even cause data tampering and disclosure.

In addition to removing and protecting known vulnerabilities, viruses and Trojans, web security is increasingly aimed at preventing unknown threats and preventing unforeseen consequences.

Machine learning is a form of artificial intelligence, which is used to study how a computer simulates or realizes human learning behavior, acquires new knowledge or skills, and reorganizes the existing knowledge structure so as to continuously improve its performance.

Artificial neural network learning is a mathematical model or computational model that simulates the structure and function of a biological neural network to estimate or approximate a function. Neural network is calculated by a large number of artificial neurons. In most cases, the artificial neural network can change the internal structure based on the external information. It is an adaptive system.

SUMMARY OF THE INVENTION

In order to solve the deficiencies of the prior art, the primary object of the present invention is to provide a method for web application layer attack detection and defense based on behavior characteristic matching and analysis.

The object of the present invention is achieved by the following technical solutions:

A method for web application layer attack detection and defense based on behavior characteristic matching and analysis, comprising:

(1) presetting a defense rule base, the defense rule base including a plurality of defense rules, the preset defense rules being classified and stored, the defense rules of each class being classified into different levels according to the level of threat;

(2) acquiring a record that access request data matches the defense rule base in a web application protection system, and taking the record as sample data;

(3) learning the sample data to establish an analysis model;

(4) establishing a user reputation database, recording a user's IP address that triggers the preset defense rules, and setting a blacklist module in the user reputation database;

(5) learning the user's access behavior through the analysis model, and updating and correcting the defense rules in the defense rule base;

(6) establishing an exception defense rule base and analyzing detected suspicious behavior to determine non-malicious behavior, and generating the exception defense rule base for each user to perform characteristic exception; and (7) setting a defense method, and intercepting the user's access behavior according to the defense method.

According to the above method, in the defense method of the step (7), if the user's access behavior matches the preset defense rules, the user's access behavior is classified to the corresponding defense rules and stored; according to the levels of the defense rules, the user's access behavior is judged whether the user's access behavior poses a threat or not, if so, it is intercepted; if not, it is not be intercepted.

According to the above method, in the defense method of the step (7), if it is determined that the user's access behavior is suspicious behavior and does not match the preset defense rules, the user's access behavior is not intercepted and the user's access behavior is recorded;

the user's historical access behavior data is collected, and the user's historical access behavior data is analyzed through the analysis model to judge whether the user's access behavior is malicious access behavior, if yes, a defense rule is set according to the user's access behavior and updated to the defense rule base, and the level of the defense rule is set; if not, an exception defense rule is set according to this user's access behavior and updated to the exception defense rule base; and the user's access behavior matching the exception defense rule is not intercepted.

According to the above method, in the step (7), a number threshold is set, if the number of consecutively triggering the defense rules reaches the preset number threshold in a certain period of time, it is determined that the behavior is a scanner attack, the user's IP address is recorded, and the user's IP address is submitted to the blacklist module.

According to the above method, in the defense method of the step (7), in the user reputation database, an integrator module is set up for each user to integrate the user's behavior triggering the defense rules each time to set an integral threshold, if the user's integral reaches the integral threshold, the user's IP address is submitted to the blacklist module.

According to the above method, all access behavior of the users in the blacklist module is intercepted.

According to the above method, in the step (1), the defense rules include, but not limited to, a regular defense rule, a malicious scan rule, a malicious crawler rule, a vulnerability rule, and a virtual patch rule.

According to the above method, in the step (2), the record that the access request data matches the defense rule base is a record that the user triggers the defense rules in the preset defense rule base during access, the web application protection system records in real time the user's behavior triggering the defense rules in the preset defense rule base during access.

According to the above method, in the step (5), through the analysis model to learn the user's access behavior, if the defense rules in the defense rule base are wrong, the wrong defense rules are corrected.

To sum up, by adopting the above technical solutions, the present invention has the following advantages and beneficial effects compared with the prior art:

(1) The present invention can accurately identify malicious behavior and solve the problems of high false alarm rate and low efficiency of traditional WAFs which use regular expressions for characteristic matching;

(2) The present invention can define the defense rules according to actual needs, and the defense rule base of the present invention can dynamically load and update in real time.

(3) By intelligently learning the user's behavior, threat behavior can be identified and intercepted quickly, and various types of threats against the web security can be effectively defended and mitigated while reducing omissions and false alarms, so as to ensure the security of the web server.

BRIEF DESCRIPTION OF THE DRAWINGS

FIG. 1 is a flowchart of the method for web application layer attack detection and defense based on behavior characteristic matching and analysis of the present invention.

DETAILED DESCRIPTION OF THE PREFERRED EMBODIMENTS

Embodiments of the present invention will now be described, by way of example only, with reference to the accompanying drawings.

Referring to FIG. 1, the present invention provides a method for web application layer attack detection and defense based on behavior characteristic matching and analysis. The method comprises:

(1) presetting a defense rule base, the defense rule base including a plurality of defense rules, the defense rules including, but not limited to, a regular defense rule, a malicious scan rule, a malicious crawler rule, a custom vulnerability rule, and a virtual patch rule, in the defense rule base, the preset defense rules being classified and stored, and the defense rules of each class being classified into different levels according to the level of threat;

(2) acquiring a record that access request data matches the defense rule base in a web application protection system, and taking the record as sample data, the record that the access request data matches the defense rule base being a record that the user triggers the defense rules in the preset defense rule base during access, the web application protection system recording in real time the user's behavior triggering the defense rules in the preset defense rule base during access;

(3) learning the sample data to establish an analysis model;

(4) establishing a user reputation database, recording a user's IP address that triggers the preset defense rules, and setting a blacklist module in the user reputation database;

(5) learning the user's access behavior through the analysis model, and updating and correcting the defense rules in the defense rule base;

(6) establishing an exception defense rule base and intelligently analyzing detected suspicious behavior to determine non-malicious behavior, and generating the exception defense rule base for each user to perform characteristic exception; and (7) setting a defense method, and intercepting the user's access behavior according to the defense method.

In the defense method of the step (7), if the user's access behavior matches the preset defense rules, that is, the preset defense rules are triggered, the user's access behavior is classified to the corresponding defense rules and stored; according to the levels of the defense rules, the user's access behavior is judged whether the user's access behavior poses a threat or not, if so, it is intercepted; if not, it is not be intercepted.

If it is determined that the user's access behavior is suspicious behavior and does not match the preset defense rules, the user's access behavior is not intercepted and the user's access behavior is recorded. The user's historical access behavior data is collected, and the user's historical access behavior data is analyzed through the analysis model to judge whether the user's access behavior is malicious access behavior, if yes, a defense is set according to the user's access behavior and the defense rule base is updated, and the level of the defense rule is set, if not, an exception defense rule is set according to this access behavior and updated to the exception defense rule base. For example, a scanner is identified that is automatically translated into a defense rule by learning the behavior of unknown scanner and issued to the defense rule base or the exception rule base.

In the above method, the user's access behavior matching the exception defense rule is not intercepted.

A number threshold is set. If the number of consecutively triggering the defense rules reaches the preset number threshold in a certain period of time, it is determined that the behavior is a scanner attack, the user's IP address is recorded, and the user's IP address is submitted to the blacklist module.

In the user reputation database, an integrator module is set up for each user to integrate the user's behavior triggering the defense rules each time to set an integral threshold. If the user's integral reaches the integral threshold, the user's IP address is submitted to the blacklist module. All access behavior of the users in the blacklist module is intercepted. All the defense rules may be set with uniform integral rules. The defense rules of different classes may be set with different integral rules. The users in the blacklist may be deleted from the blacklist after a certain period of time. If the user's access still complies with the blacklist requirement, the user is added to the blacklist again. If the number of times that the user is in the blacklist reaches the specified number threshold, user is no longer deleted from the blacklist.

According to the user's access behavior, the user's IP address may be tagged and classified, such as attack IP, malicious crawler IP, and the like. Through the long-term information collection and improvement of the user reputation database, the recognition will be more accurate.

In the step (3), the analysis model established in the present invention supports all logic syntax supported by Lua so that various web vulnerabilities can be intercepted more accurately and effectively, and has the functions of sql parsing, zero-day capture and APT attack protection capability to effectively control the false alarm rate and false negative rate, and has the ability to accurately identify the requests, parameters, content and the like of get, post, etc.

The internal security module of the present invention is in conjunction with an intrusion detection system. Besides, through data sampling in conjunction with the defense rule base, the analysis model is used for autonomous learning for a large number of access data. Through the analysis and filtering of learning algorithms, the user's behavior and access characteristics are classified. Probability calculation of a large number of suspicious URLs being accessed can accurately distinguish between normal access behavior and malicious behavior, and can update and correct the defense rule base in real time.

In the present invention, the neural network algorithm is used to establish the analysis model. The neural network algorithm automatically captures an attack and calculates the probability of triggering, and sends it to the analysis model for calculating the characteristic probability of the behavior characteristic. The invention combines the defense rule base with the user's access behavior to automatically calculate the probability of each access request and triggering the defense rules. Recalculation needs enough time and a large amount of data for analysis. In general, offline detection or bypass detection is adopted firstly, and then the learning simulation is performed through the analysis model. After the characteristic probability is calculated, a series of defense rules are specifically generated, and the defense rule base is updated and corrected. According to the new defense rule base to identify and intercept malicious characteristics, regular learning and training can reduce false alarm rate greatly.

The analysis model established by the invention may be a Naive Bayesian model, which is mainly supervised learning and unsupervised learning, combined with Naive Bayesian algorithm for analysis and correction, and a more realistic calculation and analysis algorithm is obtained to generate the corresponding defensive rule base.

The invention may combine the Naive Bayesian algorithm and the Gaussian distribution to establish the analysis model and carry out the calculation of the triggering probability and the characteristic probability of the attack behavior through the Naive Bayesian algorithm and the Gaussian distribution.

If a behavior is not in line with the known distribution of the analysis model, it is a suspicious behavior, and enters further learning to determine whether it is a malicious behavior.

In the step (5), the sample data is acquired in real time to learn the user's access behavior. Through the analysis model to learn the user's access behavior, if the defense rules in the defense rule base are wrong or there is an error in the defense rule base, the defense rules are corrected.

By establishing the defense rule base and intelligently learning the user's behavior, legitimate and illegal requests can be recognized, and common scanners and robotic attacks can be recognized. It is able to exceptionally handle normal allowed crawlers, and identify unknown crawlers, and identify and intercept other threats. By updating and correcting the defense rule base in real time, unknown threats can be found in time and timely analyzed and handled to ensure the security of the web system and make the security defense system more perfect.

Through the above method, the invention not only can use the identification technology based on the defense rule base to intercept malicious behavior, but also can analyze and identify the unknown threats, and can automatically analyze and identify the access behavior through the establishment of the analysis model to perform intelligent analysis. The invention is in combination with the user reputation database, etc. to quickly identify and intercept the threat behavior. The invention can remedy the deficiencies of the traditional defense greatly, and can reduce the omission and the false alarm rate, and can effectively prevent and mitigate various threats from web security and ensure the security of the web server.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A method for web application layer attack detection and defense based on behavior characteristic matching and analysis, rising:
   (1) presetting a defense rule base, the defense rule base including a plurality of defense rules, the preset defense rules being classified and stored, the defense rules of each class being classified into different levels according to the level of threat;
   (2) acquiring a record that access request data matches the defense rule base in a web application protection system, and taking the record as sample data;
   (3) learning the sample data to establish an analysis model;
   (4) establishing a user reputation database, recording a user's IP address that triggers the preset defense rules, and setting a blacklist module in the user reputation database;
   (5) learning the user's access behavior through the analysis model, and updating and correcting the defense rules in the defense rule base;
   (6) establishing an exception defense rule base and analyzing detected suspicious behavior to determine non-malicious behavior, generating the exception defense rule base for each user to establish characteristic exception; and
   (7) setting a defense method, and intercepting the user's access behavior according to the defense method.

2. The method for web application layer attack detection and defense based on behavior characteristic matching and analysis as claimed in claim 1, further comprising:
   before the step (7), determining whether the user's access behavior matches the preset defense rules;
   if so, classifying the user's access behavior to the corresponding defense rules and stored; and
   according to the levels of the defense rules, judging the user's access behavior as to whether the user's access behavior poses a threat or not, if so, it is intercepted; if not, it is not be intercepted.

3. The method for web application layer attack detection and defense based on behavior characteristic matching and analysis as claimed in claim 1, further comprising:
   before the step (7), determining whether it is determined that the user's access behavior is suspicious behavior and does not match the preset defense rules;
   if so, recording the user's access behavior without intercepting the user's access behavior;
   collecting the user's historical access behavior data, and analyzing the user's historical access behavior data through the analysis model to judge whether the user's access behavior is malicious access behavior;
   if yes, setting a defense rule according to the user's access behavior and updating the defense rule base, and setting the level of the defense rule; and
   if not, setting an exception defense rule according to this user's access behavior and updating the exception defense rule base;
   wherein the user's access behavior matching the exception defense rule is not intercepted.

4. The method for web application layer attack detection and defense based on behavior characteristic matching and analysis as claimed in claim 1, wherein in the step (7), a number threshold is set, if the number of consecutively triggering the defense rules reaches the preset number threshold in a certain period of time, it is determined that the behavior is a scanner attack, the user's IP address is recorded, and the user's IP address is submitted to the blacklist module, and all access behavior of the users in the blacklist module is intercepted.

5. The method for web application layer attack detection and defense based on behavior characteristic matching and analysis as claimed in claim 1, wherein in the defense method of the step (7), in the user reputation database, an integrator module is set up for each user to integrate the user's behavior triggering the defense rules each time to set an integral threshold, if the user's integral reaches the integral threshold, the user's IP address is submitted to the blacklist module, and all access behavior of the users in the blacklist module is intercepted.

6. The method for web application layer attack detection and defense based on behavior characteristic matching and analysis as claimed in claim 1, wherein in the step (1), the defense rules include, but not limited to, a regular defense rule, a malicious scan rule, a malicious crawler rule, a vulnerability rule, and a virtual patch rule.

7. The method for web application layer attack detection and defense based on behavior characteristic matching and analysis as claimed in claim 1, wherein in the step (2), the record that the access request data matches the defense rule base is a record that the user triggers the defense rules in the preset defense rule base during access, the web application protection system records in real time the user's behavior triggering the defense rules in the preset defense rule base during access.

8. The method for web application layer attack detection and defense based on behavior characteristic matching and analysis as claimed in claim 1, wherein in the step (5), through the analysis model to learn the user's access behavior, if the defense rules in the defense rule base are wrong, the wrong defense rules are corrected.

* * * * *